Sept. 10, 1968 G. A. MAY 3,401,273
BINARY FLIP-FLOP
Filed Oct. 11, 1965
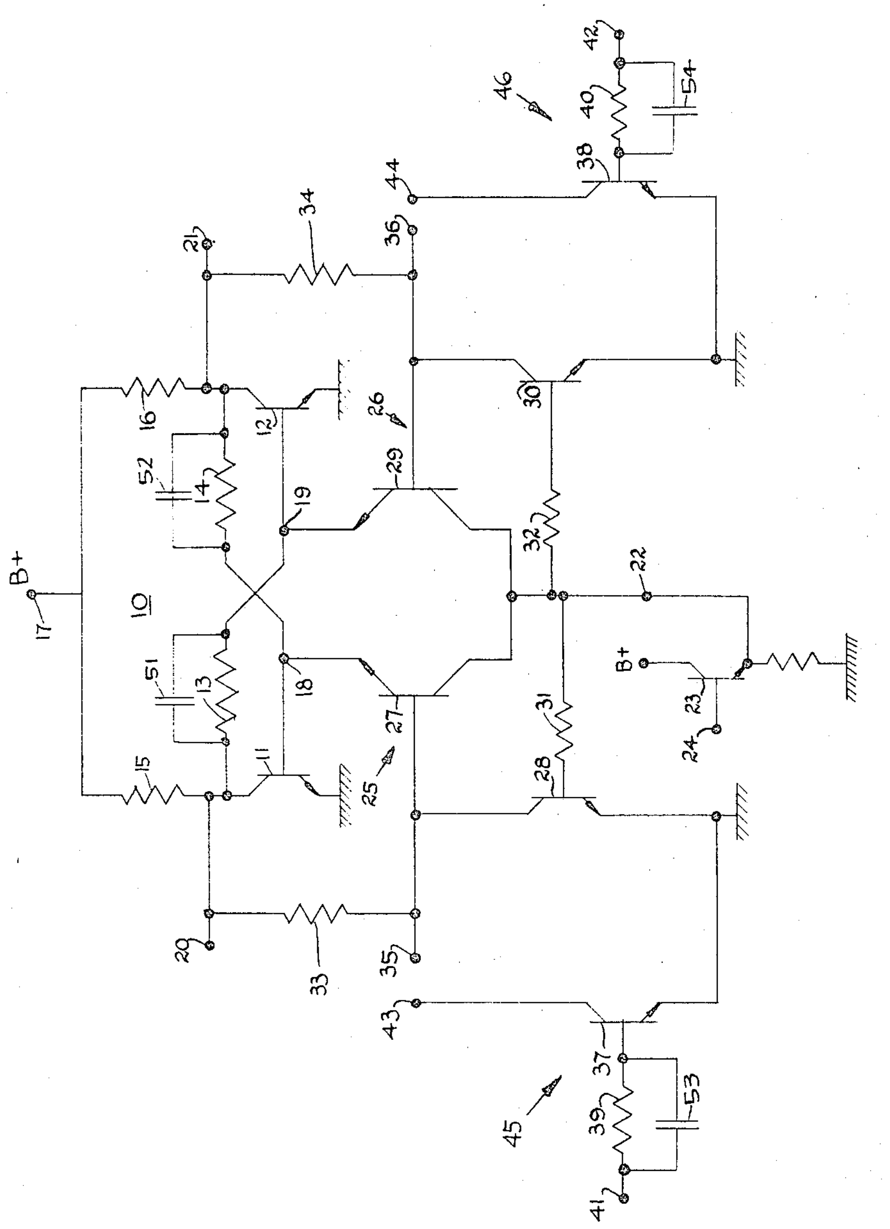
INVENTOR
George A. May
BY Harold A. Weir
PATENT AGENT United States Patent Office 3,401,273
Patented Sept. 10, 1968

3,401,273

BINARY FLIP-FLOP

George A. May, Ottawa, Ontario, Canada, assignor to Northern Electric Company Limited, Montreal, Quebec, Canada Filed Oct. 11, 1965, Ser. No. 494,544
7 Claims. (Cl. 307—247)

ABSTRACT OF THE DISCLOSURE

A flip-flop in which the bistable circuit controls the operation of two steering gates, normally operating the flip-flop in complementing sequence. A pair of control gates are provided connectable in one circuit configuration to SET and RESET the flip-flop operating as an R.S.T. flip-flop and connectable in another circuit configuration to inhibit the operation of the steering gates so that the flip-flop operates as a J–K flip-flop.

This invention relates to a binary flip-flop of simple configuration capable of operation in two different modes. More specifically, it relates to a transistor flip-flop circuit capable of operation as a J–K flip-flop or an R.S.T. flip-flop, the change in configuration being accomplished by a simple change in connections.

The designation R.S.T. flip-flop is derived from the function of the three input terminals of this type of flip-flop, Reset, Set and Trigger. Thus, an R.S.T. flip-flop is a complementing flip-flop in which a pulse applied to the trigger terminal causes the flip-flop to change from one to the other stable state. A pulse applied to the Set terminal causes the flip-flop to assume a particular one of its stable states and a pulse applied to the Reset terminal causes the flip-flop to assume the other of its stable states.

The designation J–K flip-flop refers to a flip-flop described in the textbook, "Logical Design of Digital Computers," by Phister. In the J–K flip-flop, which is a synchronous flip-flop, no ambiguous state occurs when signals are applied simultaneously to the Set and Reset terminals.

Two advantages result from the manufacture and use of flip-flop circuits having two modes of operation. In the manufacture of such circuits by integrated circuit techniques a common mask can be used for both types of flip-flop. Further, the resulting circuit may be provided with terminals so that external connections determine in which mode the flip-flop operates. In the design of digital systems the use of such flip-flops provides additional flexibility in that a simple change of connection results in a J–K flip-flop being changed to an R.S.T. flip-flop or vice versa.

It is, therefore, an object of this invention to provide a binary flip-flop circuit of simple circuit configuration capable of operation in either the J–K or the R.S.T. mode.

It is a further object of this invention to provide a binary flip-flop circuit capable of operation in either the J–K or the R.S.T. mode and adapted for manufacture by integrated circuit techniques.

Briefly, the binary flip-flop of this invention comprises a bistable circuit to which trigger pulses are supplied through one of two parallel steering gates. These steering gates, which are connected to the trigger or clock pulse input terminal, are enabled by connections from the bistable circuit to steer the trigger pulse to the appropriate side of the bistable circuit to reverse its state. Two control trol gates are also provided and, in the R.S.T. mode of the flip-flop, are connected to the bistable circuit so that when one or other of the control gates is enabled the bistable circuit is switched to a corresponding one of its two stable states. In the J–K mode of the flip-flop the control gates are connected one to each of the steering gates so that normally one of the steering gates is inhibited by its associated control gate. In the possibly ambiguous state when neither control gate inhibits its corresponding steering gate one of the steering gates is still inhibited by its connection to the bistable circuit and the bistable circuit always switches. Thus, no ambiguity results.

Other features and objects of this invention will become apparent from the following description of one specific circuit embodying the invention taken in conjunction with the accompanying drawing which represents a transistor flip-flop capable of dual mode operation.

Referring to the drawing, a conventional transistor bistable circuit 10 is formed by NPN transistors 11 and 12. Transistors 11 and 12 operate in a common emitter configuration and the base of each transistor is cross-connected to the collector of the other via resistors 13 and 14 shunted by speed-up capacitors 51 and 52, respectively. The transistors are biased for forward operation by a positive supply voltage applied to terminal 17 which is coupled via resistor 15 to the collector of transistor 11 and via resistor 16 to the collector of transistor 12.

The operation of bistable circuit 10 is well known. The circuit has a first stable state corresponding to transistor 11 conducting and transistor 12 non-conducting and a second stable state with transistor 11 non-conducting and transistor 12 conducting. When a positive pulse is applied to the base of transistor 12 during the first stable state that transistor begins to conduct and the resulting reduction of voltage on its collector is applied to the base of transistor 11 via resistor 14. This feedback action causes a rapid switching of the bistable circuit until it reaches the second stable state.

For convenience in subsequent description the bases of transistors 11 and 12 may be referred to as a first pair of terminals 18 and 19, respectively. The collectors of transistors 11 and 12 may be referred to as a second pair of terminals or junction points 20 and 21, respectively. It will be seen that when transistor 11 is non-conducting a positive pulse applied to terminal 18 of the first pair will cause the bistable circuit to change state. Similarly, when transistor 12 is non-conducting a positive pulse applied to terminal 19 of the first pair will switch the bistable circuit.

When transistor 11 is non-conducting terminal 20 assumes a positive voltage, when transistor 12 is non-conducting terminal 21 assumes a positive voltage. When either one of terminals 20 and 21 is connected to ground potential (where ground potential means the potential at the emitters of the transistors in common emitter configuration), then the bistable circuit assumes the stable state with the corresponding transistor conducting.

A trigger input terminal for the flip-flop circuit is shown at 22 and is adapted to receive trigger pulses which may be supplied from a source of pulses (not shown) through terminal 24 and emitter follower 23. Trigger input terminal 22 is connected to the first pair of terminals 18 and 19 by steering gates 25 and 26, respectively.

Steering gate 25 comprises two transistors 27 and 28. Transistor 27 has its collector connected to terminal 22 and its emitter connected to terminal 18. Thus, terminals 22 and 18 are connected together by the collector-emitter path of transistor 27. Transistor 28 has its collector-emitter path connected between the base transistor 27 and a point of reference potential designated by the conventional symbol. The base of transistor 28 is connected to terminal 22 via resistor 31. Biasing voltage for the operation of steering gate 25 is supplied by resistor 33 connected between terminal 20 and the base of transistor 27.

Steering gate 26 is identical in structure to steering gate 25 and comprises transistors 29 and 30. Transistor 29 has its collector connected to trigger input terminal 22 and its emitter connected to terminal 19. Transistor 30 has its collector connected to the base of transistor 29 and its emitter connected to a point of reference potential. The base of transistor 30 is connected to terminal 22 via resistor 32. Biasing voltage for the operation of steering gate 26 is supplied by resistor 34 connected between terminal 21 and the base of transistor 29.

In the circuit arrangement so far described, steering gates 25 and 26 are enabled only when the respective terminal of the second pair 20, 21, assumes a positive voltage. Since terminals 20 and 21 assume a positive voltage at mutually exclusive times only one of the steering gates is enabled at any time.

When steering gate 25 is enabled, transistor 27 is biased into conduction and its collector-emitter path couples the trigger input terminal 22 to terminal 18 of the bistable circuit. Similarly, when steering gate 26 is enabled, transistor 29 is biased into conduction and couples trigger input terminal 22 to terminal 19 of the bistable circuit.

The complementing action of the flip-flop in response to trigger pulses applied to terminal 22 will be readily apparent. When bistable circuit 10 is in its first stable state, with transistor 11 conducting and transistor 12 non-conducting, terminal 21 is at a positive voltage and steering gate 26 is enabled. The next occurring trigger pulse at terminal 22 is coupled via steering gate 26 to terminal 19 of the bistable circuit. This positive pulse applied to the base of transistor 12 turns on the transistor and the bistable circuit switches to its second stable state with transistor 12 conducting and transistor 11 non-conducting. When the bistable circuit switches to its second stable state steering gate 25 is enabled to apply the next occurring trigger pulse to terminal 18 of the bistable circuit and thus return the bistable circuit to its first stable state.

Transistors 28 and 30 perform the function of shortening the duration of the trigger pulse applied to the bistable circuit 10. Considering the action of transistor 28 in steering gate 25, the positive trigger pulse is coupled to the base of transistor 28 via resistor 31. Transistor 28 will turn on after a delay determined by the time constant of the circuit formed by resistor 31 and the capacitances associated with the base-emitter junction of transistor 28. This results in the base of transistor 27 being coupled to ground via the collector-emitter path of transistor 28 thereby turning off transistor 27. The trigger pulse being supplied to terminal 18 of the bistable circuit ceases when transistor 27 has been turned off. Thus, the duration of the trigger pulse supplied to terminal 18 is determined by the sum of the delay in turning on transistor 28 and the delay in turn-off transistor 27. The action of transistor 30 in shortening the duration of the trigger pulse applied to terminal 19 of the bistable circuit is identical to the action of transistor 28 described above.

The circuit which has been described so far, forms a complementing flip-flop comprising a bistable circuit and two associated steering gates appropriately coupled to the bistable circuit to give complementing action in response to a trigger pulse input. To form an R.S.T. flip-flop two further gates are required; one responding to a SET input to switch the bistable circuit to its first stable state and the other responding to a RESET input to switch the bistable circuit to its second stable state.

These further gates are provided by control gates 45 and 46. Control gate 45 comprises a transistor 37 connected in the common emitter configuration with its collector defining a terminal or junction point 43. A control terminal 41 is provided, adapted to be connected to a source of control signals such as SET signals. Terminal 41 is connected to the base of transistor 37 by a resistor 39 shunted by a speed-up capacitor 53.

Control gate 46 is identical in structure to gate 45 and comprises a transistor 38 connected in the common emitter configuration with its collector defining a terminal or junction point 44. A control terminal 42 is provided for connection to a source of control signals such as RESET signals. Terminal 42 is connected to the base of transistor 38 by a resistor 40 shunted by a speed-up capacitor 54.

To arrange the circuit for operation as an R..ST. flip-flop terminal 43 is connected to terminal 20 and terminal

44 is connected to terminal 21. This results in control gate 45 being in parallel with transistor 11 and control gate 46 being in parallel with transistor 12. When a positive voltage is applied to control terminal 41 to SET the flip-flop, transistor 37 is turned on thereby grounding terminal 20 and switching the bistable circuit to its first stable state. In a similar fashion when a positive voltage is applied to control terminal 42 to RESET the flip-flop transistor 38 is turned on thereby grounding terminal 21 and switching the bistable circuit to its second stable state.

To arrange the circuit of this invention for operation as a J-K flip-flop terminal 43 is connected to terminal 35 and terminal 44 is connected to terminal 36. Thus, control gate 45, when energized, inhibits steering gate 25 and control gate 46, when energized, inhibits steering gate 26. A J-K flip-flop is a synchronous flip-flop having a source of clock pulses applied to terminal 22. A signal representing $\overline{J}$ is applied to terminal 41 and a signal representing $\overline{K}$ is applied to terminal 42. The operation of the circuit for different combinations of input signals is given in the appended table in which "+" represents a positive voltage with respect to ground and "0" represents a voltage substantially at ground potential. It will be clear that when $J=K=1$ and hence terminals 41 and 42 are at ground potential (being connected to $\overline{J}$ and $\overline{K}$ and not J and K, respectively) no ambiguous state occurs since the flip-flop always switches.

TABLE

| Before Trigger Pulse | | | | | |
|---|---|---|---|---|---|
| Externally Determined | | Determined by Previous State | | After Trigger Pulse, New State | |
| $\overline{J}$ (Terminal 41) | $\overline{K}$ (Terminal 42) | Terminal 20 | Terminal 21 | Terminal 20 | Terminal 21 |
| + | 0 | 0 | + | + | 0 |
| 0 | + | 0 | + | 0 | + |
| + | 0 | + | 0 | + | 0 |
| 0 | + | + | 0 | 0 | + |
| 0 | 0 | + | 0 | 0 | + |
| 0 | 0 | 0 | + | + | 0 |
| + | + | 0 | + | 0 | + |
| + | + | + | 0 | + | 0 |

Thus, there has been described a dual mode flip-flop capable of operation either as an R.S.T. flip-flop or as a J-K flip-flop, the change of configuration being accomplished by a simple change of connections. While the particular embodiment of the invention described herein uses conventional junction transistors it will be clear to those skilled in the art that the circuit of this invention may be constructed using bipolar transistors, field effect transistors, insulated gate transistors or any other suitable form of a three pole inverting switch.

I claim:

1. A dual mode flip-flop comprising:
   a bistable circuit having a first and a second terminal and being responsive to a signal decreasing the voltage at said first terminal to assume its SET condition and being responsive to a signal decreasing the voltage at said second terminal to assume its RESET condition,
   a pair of steering gates enabled at mutually exclusive intervals by conductive connections to said bistable circuit to supply trigger pulses to operate said bistable circuit in complementing sequence,
   said steering gates having third and fourth terminals responsive to signals to inhibit the action of each of said steering gates,
   a pair of control gates connectable in a first circuit configuration to said first and second terminals to form an R.S.T. flip-flop or connectable in a second circuit configuration to said third and fourth terminals to form a J-K flip-flop.

2. In a dual mode flip-flop having a transistor bistable circuit including a first and second transistor operated in complementing sequence by trigger pulses supplied from a common trigger terminal via a first and a second steering gate enabled at mutually exclusive intervals by conductive connections to said bistable circuit, the improvement comprising a first and a second control gate, said first control gate being connectable in a first circuit configuration to shunt said first transistor and selectively set said bistable circuit to one of its two stable states, said first control gate being connectable in a second circuit configuration to selectively inhibit said first steering gate, said second control gate being connectable in said first circuit configuration to shunt said second transistor and selectively set said bistable circuit to the other of its two stable states, said second control gate being connectable in said second circuit configuration to selectively inhibit said second steering gate.

3. The invention as defined in claim 2 wherein said first and second control gate each comprise a transistor connected in the common emitter configuration.

4. A dual mode flip-flop comprising:

a bistable circuit having a first and a second pair of terminals, said bistable circuit being responsive to a pulse at one of said first pair of terminals to assume a first one of two stable states and being responsive to a pulse at the other of said first pair of terminals to assume a second one of said two stable states, said bistable circuit having a predetermined voltage at one of said second pair of terminals in said first stable state and having a predetermined voltage at the other of said second pair of terminals in said second stable state, said bistable circuit being responsive to a signal decreasing said predetermined voltage at said one of said second pair of terminals to assume said second stable state and being responsive to a signal decreasing said predetermined voltage at said other of said second pair of terminals to assume said first stable state, a trigger terminal for connection to a source of trigger pulses, a first and a second steering gate connected respectively between said trigger terminal and said one of said first pair of terminals and between said trigger terminal and said other of said first pair of terminals, first conductive means connecting said other of said second pair of terminals to said first steering gate to enable said first steering gate when said other of said second pair of terminals assumes said predetermined voltage, second conductive means connecting said one of said second pair of terminals to said second steering gate to enable said second steering gate when said one of said second pair of terminals assumes said predetermined voltage, a first and a second control gate each having a control terminal for connection to sources of control voltage, said first control gate being adapted for connection in a first circuit configuration to said other of said second pair of terminals and in a second circuit configuration to said first steering gate, said second control gate being adapted for connection in said first circuit configuration to said one of said second pair of terminals and in said second circuit configuration to said second steering gate.

5. A dual mode flip-flop comprising:

a bistable circuit including first and second transistors in a common emitter circuit configuration having their bases and collectors conductively cross-connected to render one of said transistors conductive when the other is non-conductive, and vice versa, a trigger terminal for connection to a source of trigger pulses, first and second steering gates connected between said trigger terminal and the bases of said first and second transistor respectively, a conductive connection from the collectors of said first and second transistors to said first and second steering gates respectively to enable said first steering gate when said first transistor is non-conductive and to enable said second steering gate when said second transistor is non-conductive, a first and a second control gate each having a control terminal for connection to sources of control voltage, said first control gate being adapted for connection in a first circuit configuration shunting said first transistor and in a second circuit configuration controllably disabling said first steering gate, said second control gate being adapted for connection in said first circuit configuration shunting said second transistor and in said second circuit configuration controllably disabling said second steering gate, whereby said flip-flop operates in said first circuit configuration as an R.S.T. flip-flop and in said second circuit configuration as a J-K flip-flop.

6. A dual mode flip-flop as defined in claim 5 wherein each said control gate comprises a transistor connected in the common emitter configuration responsive to a control voltage at the respective control terminal to be rendered conductive.

7. A dual mode flip-flop comprising:

a bistable circuit including first and second transistors in a common emitter circuit configuration having their bases and collectors conductively cross-connected to render one of said transistors conductive when the other is non-conductive, and vice versa, the collector electrodes of said first and second transistor defining a first and second junction point respectively, a trigger terminal for connection to a source of trigger pulses, first and second steering gates connected between said trigger terminal and the bases of said first and second transistor respectively, each said steering gate comprising a third transistor with its collector electrode connected to said trigger terminal and its emitter electrode connected to the base electrode of the corresponding transistor in said bistable circuit and a fourth transistor connected in common emitter circuit configuration with its collector and base electrodes connected to the base and collector electrodes respectively, of said third transistor, the base electrodes of the third transistor of said first and second steering gates defining a third and fourth junction point respectively, said first junction point being conductively connected to the base of said third transistor of said first steering gate to enable said first steering gate when said first transistor is non-conductive, said second junction point being conductively connected to the base of said third transistor of said second steering gate to enable said second steering gate when said second transistor is non-conductive, a first and a second control terminal for connection to sources of control voltage, a fifth transistor connected in common emitter configuration having its base electrode connected to said first control terminal and its collector electrode defining a fifth junction point, and a sixth transistor connected in common emitter configuration having its base electrode connected to said second control terminal and its collector electrode defining a sixth junction point, said fifth junction point being connectable to said first junction point and said sixth junction point being connectable to said second junction point to render said flip-flop operable in the R.S.T. mode, said fifth junction point being connectable to said third junction point and said sixth junction point being connectable to said fourth junction point to render said flip-flop operable in the J-K mode.

(References on following page)

References Cited

UNITED STATES PATENTS

| | | | |
|---|---|---|---|
| 3,187,200 | 6/1965 | Gardner et al. | 307—88.5 |
| 3,238,387 | 3/1966 | Hill | 307—88.5 |
| 3,305,728 | 2/1967 | Bailey | 307—88.5 |

OTHER REFERENCES

G.E. Transistor Manual by General Electric, Copyright August 1964, TK 7822, T73, Ca4, C, 2, (copy enclosed, pp. 188–190).

JOHN S. HEYMAN, *Primary Examiner.*